US012434083B2

(12) United States Patent
Krueger et al.

(10) Patent No.: US 12,434,083 B2
(45) Date of Patent: Oct. 7, 2025

(54) DEPLOYABLE FIRE OR SMOKE BARRIER WITH MANUAL EGRESS

(71) Applicant: Smoke Guard, Inc., Boise, ID (US)

(72) Inventors: Logan Krueger, Boise, ID (US); Tom Minshew, Boise, ID (US)

(73) Assignee: SMOKE GUARD, INC., Boise, ID (US)

( * ) Notice: Subject to any disclaimer, the term of this patent is extended or adjusted under 35 U.S.C. 154(b) by 462 days.

(21) Appl. No.: 17/978,920

(22) Filed: Nov. 1, 2022

(65) Prior Publication Data

US 2023/0133377 A1 May 4, 2023

Related U.S. Application Data

(60) Provisional application No. 63/345,638, filed on May 25, 2022, provisional application No. 63/303,127, filed on Jan. 26, 2022, provisional application No. 63/278,641, filed on Nov. 12, 2021, provisional application No. 63/274,696, filed on Nov. 2, 2021.

(51) Int. Cl.

| | |
|---|---|
| ***E06B 9/13*** | (2006.01) |
| ***A62C 2/10*** | (2006.01) |
| ***E06B 9/58*** | (2006.01) |
| ***E06B 9/60*** | (2006.01) |
| *E06B 9/11* | (2006.01) |

(52) U.S. Cl.

CPC .................. *A62C 2/10* (2013.01); *E06B 9/13* (2013.01); *E06B 9/581* (2013.01); *E06B 9/60* (2013.01); *E06B 9/11* (2013.01)

(58) Field of Classification Search

CPC ... E06B 9/581; E06B 9/60; E06B 9/42; E06B 9/74; E06B 9/11; E06B 9/13; E05Y 2900/106; E05D 13/1253; E05D 13/1261; E05D 13/12; E05D 13/10; A62C 2/10

See application file for complete search history.

(56) References Cited

U.S. PATENT DOCUMENTS 5,195,594 A * 3/1993 Allen ........................ A62C 2/10 169/48
5,383,510 A * 1/1995 Allen ........................ A62C 2/10 160/310
5,803,150 A * 9/1998 Boiteau ............... E04F 10/0648 160/310
5,865,235 A * 2/1999 Krupke ............... E05D 13/1261 160/201
6,896,027 B2 * 5/2005 Crouch ..................... E06B 9/60 160/315

(Continued)

FOREIGN PATENT DOCUMENTS

KR 200478475 Y1 * 10/2014

*Primary Examiner* — Abe Massad

(74) *Attorney, Agent, or Firm* — Dickinson Wright PLLC

(57) ABSTRACT

The present disclosure relates to a barrier system for shielding humans from harmful exposure to fire, smoke, noxious fumes, or contaminated air. Some embodiments provide a deployable barrier system that has a barrier retract assist system configured to assist a user in manually moving the barrier from the deployed position toward the retracted position with at least a portion of the barrier being rolled onto the barrel portion for egress past the barrier. The retract assist system can be positioned inside of the barrel portion.

14 Claims, 9 Drawing Sheets

(56) References Cited

U.S. PATENT DOCUMENTS

| | | | | |
|---|---|---|---|---|
| 8,113,266 | B2 * | 2/2012 | Cloninger | E06B 9/13 160/310 |
| 8,291,960 | B2 * | 10/2012 | Bowman | E06B 9/17046 160/267.1 |
| 9,493,984 | B2 * | 11/2016 | Casey | E06B 9/581 |
| 10,934,775 | B2 * | 3/2021 | Zhang | E06B 9/322 |
| 2005/0001573 | A1 * | 1/2005 | Miller | E05F 15/43 318/445 |
| 2005/0005545 | A1 * | 1/2005 | Jerry | E06B 9/581 52/204.5 |
| 2012/0048484 | A1 * | 3/2012 | Munsters | B60J 1/2063 160/313 |
| 2014/0014281 | A1 * | 1/2014 | Mullet | E06B 9/60 160/311 |
| 2014/0352898 | A1 * | 12/2014 | Veatch | E06B 9/62 29/525.01 |
| 2018/0371833 | A1 * | 12/2018 | Klish | E06B 9/13 |
| 2020/0173231 | A1 * | 6/2020 | Drifka | E06B 9/13 |
| 2021/0310301 | A1 * | 10/2021 | Janiczek | E06B 9/581 |

* cited by examiner

DEPLOYABLE FIRE OR SMOKE BARRIER WITH MANUAL EGRESS

CROSS-REFERENCE TO RELATED APPLICATIONS

The present application claims priority to U.S. Provisional Patent Application No. 63/274,696, titled Smoke or Fire Screen with Manual Egress, filed Nov. 2, 2021, U.S. Patent Application No. 63/278,641, titled Smoke or Fire Screen with Manual Egress, filed Nov. 11, 2021, U.S. Patent Application No. 63/303,127, titled Smoke or Fire Screen with Manual Egress, filed Jan. 26, 2022, and U.S. Patent Application No. 63/345,638, titled Transparent Smoke or Fire Screen with Manual Egress, filed May 25, 2022, all of which are incorporated herein by reference.

TECHNICAL FIELD

This present disclosure relates to a barrier system for shielding humans from harmful exposure to fire, smoke, noxious fumes, or contaminated air, and more particularly to a deployable fire or smoke barrier system configured to allow for manual egress and the ability to see through the barrier.

BACKGROUND

In order to protect humans against smoke, fumes, or fire in a structure that may be undergoing a fire event, many different types of isolation devices have been developed over the years. These devices are intended to seal off certain openings through which smoke or fumes are likely to travel. In high-rise structures (e.g., office buildings, apartment buildings) it is important to seal off elevator openings since their shafts and openings are key ways through which smoke can migrate from one floor to other floors in the structure. However, it is also important that after a fire screen is deployed (e.g., lowered from above an elevator opening) that the screen be movable to allow people to pass through the screened opening. The screen should then automatically recover and reseal to ensure that smoke migration does not occur. The use of the word screen also includes curtains, barriers, and other fiberglass-based textiles.

In addition to easy egress, in some embodiments, it is important for the screen to be transparent when the screen is closed so that one can see between the elevator hoistway to the landing when additional doors or devices (e.g., a smoke or fire screen) are in the closed position. This requirement is set forth in ASME A17.1 Section 2.11.6.3(d), which is intended to allow firefighters to see the elevator landing or lobby when the hoistway door is no more than one quarter open.

Two systems for sealing off elevators are the M2100 and M2500 products from Smoke Guard of Boise, Idaho. These products are described to a certain extent in U.S. Pat. Nos. 5,195,594 and 5,383,510 (which are incorporated herein by reference). Screens such as the M2100 and M2500 from Smoke Guard use a heat resistant film that is captured along the vertical and horizontal edges and detachably constrained into a metallic frame around an elevator opening. When not in use, the screen assemblies are rolled up into a tight cylindrical form and retracted upward into an enclosure, usually a hidden housing assembly in the ceiling above the protected opening.

In the prior art, the attachment mechanism used by most of those skilled in the art is either magnetically captured or non-detachable. Magnetically detachable screens (e.g., Models 200, 400, and 600 from Smoke Guard) work, but are not necessarily intuitive for a user. A person wishing to exit through the deployed screen has to understand (perhaps under duress because of a fire emergency) that they can push through the screen to detach the magnets.

A less common prior art manual egress technology uses a lifting aid (e.g., a lifting strap). Unlike with magnets where someone exiting pushes through the screen, with lifting technology, a person exiting an area with a deployed fire screen uses a lifting aid on the screen to pull the screen upward and back toward or into the housing assembly above the entrance. An example of a product with a lifting strap is "Smokeshield" ERF10 from Cornell Cookson. The problem with these prior art lifting assemblies is that a smoke and fire screen deployed from a housing above an entrance is necessarily very flexible so that it can be rolled into a cylinder in the housing. Manually lifting a flexible, rollable screen is somewhat like pushing on a rope. Because of this "pushing on a rope" phenomenon, prior art screens using lifting straps or other lifting aids have required a large housing size, constrained the usable size of the screen (i.e., width or height), or limited how high the screen can be lifted. For example, the ERF10 product requires 8 inches of vertical and almost 14 inches of horizontal space for the housing. Also, the tabs on these assemblies that are slidably engaged with the guides on the entrance frame have a tendency to degrade over time and cause issues with the lowering and lifting of the fire screen apparatus.

Another problem with using a lifting aid is that the prior art screens have required additional weight at the bottom of the screen to make sure that the screen will gravity-deploy when both electrical and battery power are lost. In prior art systems, the motor acts as a brake, but this made additional weight necessary for the screen to fall at a rate within specifications. However, a weight at the bottom of the screen exacerbates the "pushing on a rope" issue discussed above when the manual lifting strap is used, since a screen with a weight on the bottom is more likely to fold in on itself. Accordingly, a motor assembly that allows for the screen to both gravity-fall at a specified rate and be raised with a minimum amount of force is desired.

Another issue with many prior art screen systems is the lack of transparency through the screen. This is a safety issue (especially for firefighters) and it is also a code requirement in some end uses.

There is a need for a manual egress screen system apparatus that is transparent, simple, and intuitive to use, does not require electrical activation for egress, can be installed on relatively wide entrance ways, opens vertically high enough to easily pass through, and can be lifted with a minimum amount of lifting force so that essentially anyone can utilize the lifting strap.

SUMMARY

The systems and methods of the current technology overcome drawbacks experienced in the prior art and provides additional benefits. An embodiment of the present technology provides a deployable barrier system for blocking transmission smoke or fire that has a housing and a barrel portion contained in the housing. The barrel portion is rotatable relative to the housing in opposing first and second directions. A motor is coupled to the barrel portion and is activatable to rotate the barrel portion in at least the first direction. A flexible barrier is coupled to the barrel portion and is moveable between retracted and deployed positions, wherein the flexible barrier is rolled onto the barrel portion and contained within the housing when the flexible barrier is in the retracted position. The barrier is unrolled from the barrel portion with at least a portion extending downwardly from the housing when the barrier is in the deployed position. Rotation of the barrel portion in the first direction upon activation of the motor is configured to roll the barrier onto the barrel portion to move the barrier from the deployed position to the retracted position. The barrier is moveable under at least the force of gravity from the retracted position to the deployed position causing the barrel portion to rotate in the second direction.

A retract assist system is configured to assist a user in manually moving the barrier from the deployed position toward the retracted position with at least a portion of the barrier being rolled onto the barrel portion for egress past the barrier. The retract assist system is positioned in the barrel portion and has an inner shaft with opposing first and second end portions. A spring member is positioned about the inner shaft and has an idle end portion and a rotating end portion. A first attachment member is fixedly attached to the first end portion of the inner shaft and to the idle end portion of the spring member. The first attachment member, the inner shaft, and the idle end portion of the spring member are configured to be fixed and to not rotate relative to the housing upon rotation of the barrel portion and movement of the barrier between the retracted and deployed positions. The retract assist system may include a preload axle that is attached to the first attachment member and adjustably rotatable to cause a preloaded torsional force in the spring member before the first attachment member and the idle end portion of the spring member are fixed in position relative to the housing. The retract assist system may also include a bearing member is coaxially coupled to the first attachment member and is fixedly attached to a first portion of the barrel portion. The bearing member is configured to allow the barrel portion to rotate in the first and second directions relative to the first attachment member and to the idle end portion of the spring member. A second attachment member is rotatably coupled to the second end portion of the inner shaft and fixedly attached to a second portion of the barrel portion and to the rotating end portion of the spring member. The second attachment member rotates with the barrel portion relative to the housing as the barrier moves between the retracted and deployed positions. The barrel portion, the inner shaft, and the spring member may be concentric. The retract assist system is configured to wind the spring member relative to the inner shaft when the barrel portion moves in the first direction and the barrier moves to the deployed position to create a spring force configured to assist movement of the barrier from the deployed position toward the retracted position when a user applies a lifting force to the barrier to allow for manual egress past the barrier.

Another embodiment of the technology provides a deployable barrier system having a housing and a collector core contained in the housing and being rotatable in opposing first and second directions. A driver is coupled to the collector core and is activatable to rotate the collector core in at least the first direction. A barrier is coupled to the collector core and moveable between retracted and deployed positions. The barrier is wrapped on the collector core and contained within the housing when the barrier is in the retracted position. The barrier is at least partially unwrapped from the collector core and extends downwardly from the housing when the barrier is in the deployed position. Rotation of the collector core in the first direction rolls the barrier onto the collector core to move the barrier from the deployed position to the retracted position. A retract assist system is configured to assist moving the barrier from the deployed position toward the retracted position with at least a portion of the barrier being rolled onto the collector core for egress past the barrier. The retract assist system is concentrically positioned in the collector core.

The retract assist system has an inner shaft with opposing first and second end portions. An urging member is positioned about the inner shaft and having an idle end portion and a rotating end portion. A first attachment member is fixedly attached to the first end portion of the inner shaft and to the idle end portion of the urging member, wherein the first attachment member, the inner shaft, and the idle end portion are configured to be fixed and to not rotate relative to the housing upon rotation of the collector core. A bearing is coupled to the first attachment member and is fixedly attached to a first portion of the collector core. The bearing allows the collector core to rotate in the first and second directions relative to the first attachment member and the idle end portion of the urging member. A second attachment member is rotatably coupled to the second end portion of the inner shaft and is fixedly attached to a second portion of the collector core and to the rotating end portion of the urging member. The second attachment member rotates with the collector core relative to the housing as the barrier moves between the retracted and deployed positions. The retract assist system is configured to load the urging member when the collector core rotates in the first direction and the barrier moves to the deployed position to create an urging force configured to assist movement of the barrier from the deployed position toward the retracted position when a user applies a lifting force to the barrier to allow for manual egress past the barrier.

Another aspect of the present technology provides a method of deploying a fire or smoke barrier system. The method comprises activating the fire or smoke barrier system, wherein the barrier system includes a housing and a collector core contained in the housing and that is rotatable in opposing first and second directions. A driver is coupled to the collector core and is activatable to rotate the collector core in at least the first direction. The barrier is coupled to the collector core and is moveable between retracted and deployed positions, wherein the barrier is wrapped on the collector core and contained within the housing when the barrier is in the retracted position. The barrier is at least partially unwrapped from the collector core and extends downwardly from the housing when the barrier is in the deployed position. Rotation of the collector core in the first direction is configured to roll the barrier onto the collector core to move the barrier from the deployed position to the retracted position. A retract assist system is configured to assist moving the barrier from the deployed position toward the retracted position with at least a portion of the barrier being rolled onto the collector core for egress past the barrier. The retract assist system is concentrically positioned in the collector core. The retract assist system has an inner shaft with opposing first and second end portions. An urging member is positioned about the inner shaft and has an idle end portion and a rotating end portion. A first attachment member is fixedly attached to the first end portion of the inner shaft and to the idle end portion of the urging member. The first attachment member, the inner shaft, and the idle end portion are configured to be fixed and to not rotate relative to the housing upon rotation of the collector core. The bearing is coupled to the first attachment member and is fixedly attached to a first portion of the collector core. The bearing allows the collector core to rotate in the first and second directions relative to the first attachment member and the idle end portion of the urging member. A second attachment member is rotatably coupled to the second end portion of the inner shaft and is fixedly attached to a second portion of the collector core and to the rotating end portion of the urging member. The second attachment member rotates with the collector core relative to the housing as the barrier moves between the retracted and deployed positions. The retract assist system is configured to load the urging member when the collector core rotates in the first direction and the barrier moves to the deployed position to create an urging force configured to assist movement of the barrier from the deployed position toward the retracted position when a user applies a lifting force to the barrier to allow for manual egress past the barrier.

The method includes allowing the collector core to rotate in the first direction to move the barrier from the retracted position to the deployed position. The rotating end portion of the urging member is wound while the idle end portion remains stationary relative to the housing as the collector core rotates in the first direction. The urging force is stored in the urging member when the barrier is in the deployed position. The barrier is allowed to be manually lifted by a user applying a lifting force to the barrier when the barrier is in the deployed position, so the collector core rotates in the second direction. The method includes applying the urging force to the collector core as the collector core rotates in the second direction, wherein the urging force combines with the lifting force to assist the user in manually lifting the barrier away from the deployed position to allow the user to egress past the barrier.

Another aspect of the technology provides a deployable fire or smoke barrier system having a housing, a barrel portion rotatably contained in the housing, and a flexible barrier with first and second side portions. The flexible barrier is coupled to the barrel portion and is moveable between retracted and deployed positions, wherein the flexible barrier is rolled onto the barrel portion and contained within the housing when the flexible barrier is in the retracted position. The barrier is unrolled from the barrel portion and at least a portion extends downwardly from the housing when the barrier is in the deployed position. Rotation of the barrel portion in the first direction upon activation of the motor is configured to roll the barrier onto the barrel portion to move the barrier from the deployed position to the retracted position. The barrier is moveable under at least the force of gravity from the retracted position to the deployed position causing the barrel portion to rotate in the second direction. First and second side guides are spaced apart from each other and configured to receive the first and second side portions respectively of the barrier. A barrier retention system is connected to the first and second side portions of the barrier and is configured to be at least partially contained in the housing while the barrier is in the retracted position and to be slideably positioned in the first and second side guides when the barrier is in the deployed position.

The barrier retention system has a plurality of tabs spaced apart along first and second side edge portions of the barrier and configured to extend into a portion of the first or second side guides. The tabs each have proximal and distal ends. The proximal end is connected to the first or second side edge portion of the barrier, and the distal end is spaced apart from the respective first or second side edge portion of the barrier. Each tab has an internal reinforcement segment with a first aperture adjacent to the distal end. Fire-resistant fabric strips cover the internal reinforcement segment. Each fabric strip has at least one second aperture axially aligned with the first aperture on the internal reinforcement segment. A retention pin extends through the first and second apertures, wherein the retention pin is substantially normal to the distal end of the respective tab. The retention rod is configured to be slidably translatable within the first or second side guide and being blocked from pulling out of the first or second side guide so as to retain the first and second side edge portions of the barrier immediately adjacent to the respective first and second side guides.

Another aspect of the present technology provides a smoke barrier system usable adjacent to an opening in a structure. The barrier system has a housing, a collector core in the housing and being rotatable in opposing first and second directions, and a barrier with first and second side portions. The barrier is coupled to the collector core and is moveable between retracted and deployed positions, wherein the barrier is within the housing when the barrier is in the retracted position, and the barrier is at least partially unwrapped from the collector core and extends downwardly from the housing when the barrier is in the deployed position. The barrier system has a retract assist system concentrically positioned in the collector core. The retract assist system includes an inner shaft with opposing first and second end portions, and a torsion spring positioned about the inner shaft fixed relative to the first end portion. The torsion spring has an idle end portion and a rotating end portion, wherein the idle end portion and the inner shaft do not rotate relative to the housing upon rotation of the collector core. An attachment member is rotatably coupled to the second end portion of the inner shaft and is fixedly attached to the collector core and to the rotating end portion of the torsion spring. The second attachment member rotates with the collector core relative to the housing as the barrier moves between the retracted and deployed positions. The retract assist system loads the torsion spring when the collector core rotates in the first direction and the barrier moves to the deployed position to create an urging force configured to assist movement of the barrier from the deployed position toward the retracted position when a user applies a lifting force to the barrier to allow for manual egress past the barrier.

The barrier system of the embodiment also has a fire screen deployment subsystem that comprises first and second side guides adjacent to the opening in the structure and spaced apart from each other. The first and second side guides are configured to receive the first and second side portions respectively of the barrier. A barrier retention system is connected to the first and second side portions of the barrier and configured to be at least partially contained in the housing while the barrier is in the retracted position and to be slideably positioned in the first and second side guides when the barrier is in the deployed position. The barrier retention system has a plurality of tabs spaced apart along first and second side edge portions of the barrier and configured to extend into a portion of the first or second side guides. The tabs each have proximal and distal ends. The proximal end of each tab is connected to the first or second side edge portion of the barrier, and the distal end is spaced apart from the respective first or second side edge portion of the barrier. Each tab has an internal reinforcement segment with a first aperture adjacent to the distal end. Fire-resistant fabric strips cover the internal reinforcement segment, wherein each fabric strip has at least one second aperture axially aligned with the first aperture on the internal reinforcement segment. A retention pin extends through the first and second apertures, wherein the retention pin is substantially normal to the distal end of the respective tab, wherein the retention rod is configured to be slidably translatable within the first or second side guide and being blocked from pulling out of the first or second side guide so as to retain the first and second side edge portions of the barrier immediately adjacent to the respective first and second side guides.

BRIEF DESCRIPTION OF THE DRAWINGS

Features, aspects, and advantages of the presently disclosed technology may be better understood with regard to the following drawings.

FIG. 1(*b*) is a front perspective view of the deployable barrier system of an embodiment of the present technology.

FIG. 4(*b*) is a plan view of the barrier retention system in FIG. 4A.

FIG. 7(*b*) is a side view of the screen egress system in FIG. 7(*a*).

FIG. 7(*c*) is a cross-sectional view of the screen egress system in FIG. 7(*b*) substantially along plane 7(*c*)-7(*c*).

FIGS. 7(*d*) and 7(*e*) are detailed cross-sectional views of the idle and rotating ends, respectively, of the screen egress system in FIG. 7(*c*).

Figure 1A:
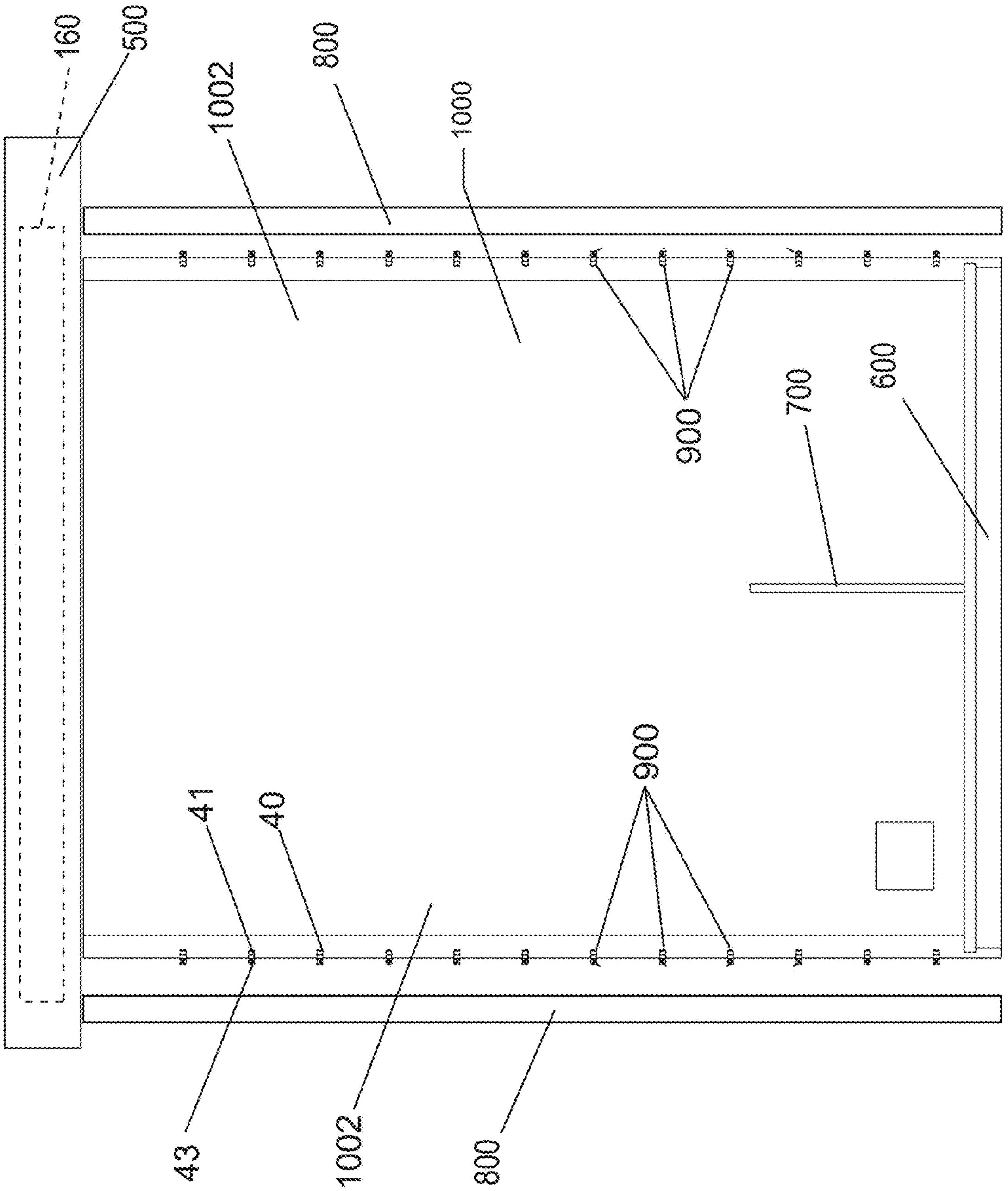
FIG. 1(*a*) is a partially exploded elevation view of a deployable barrier system of an embodiment of the present technology.

A person skilled in the relevant art will understand that the features shown in the drawings are for purposes of illustration, and variations including different and/or additional features and arrangements thereof are possible.

DETAILED DESCRIPTION

The present disclosure describes deployable fire or smoke barrier systems in accordance with certain embodiments of the present technologies. Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents, and alternatives falling within the spirit and scope of the claims. Changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale, and certain features and certain views of the figures may be shown exaggerated in scale or in schematic in the interest of clarity and conciseness.

As used herein and throughout various portions (and headings) of this patent application, the terms "disclosure," "present disclosure," and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

The term "coupled," "fixedly attached," and the like, and variations thereof, as used herein and in the appended claims are intended to mean either an indirect or direct connection or engagement. Thus, if a first device couples to a second device, that connection may be through a direct connection, or through an indirect connection via other devices and connections.

Certain terms are used herein and in the appended claims to refer to particular components. As one skilled in the art will appreciate different persons may refer to a component by different names. This document does not intend to distinguish between components that differ in name but not function.

Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Described embodiments of the present disclosure thus offer advantages over the prior art and are well adapted to carry out one or more of the objects of this disclosure. However, the present disclosure does not require each of the components and acts described above and are in no way limited to the above-described embodiments or methods of operation. Any one or more of the above components, features, and processes may be employed in any suitable configuration without inclusion of other such components, features, and processes. Moreover, the present disclosure includes additional features, capabilities, functions, methods, uses, and applications that have not been specifically addressed herein but are, or will become, apparent from the description herein, the appended drawings, and claims.

The present technology now will be described more fully with reference to the accompanying drawings, in which some preferred embodiments of the invention are shown. This technology may, however, be embodied in many different forms and should not be construed as limited to the embodiments set forth herein; rather, these embodiments are provided so that this disclosure will be thorough and complete, and will fully convey the scope of the invention to those skilled in the art.

Figure 1B:
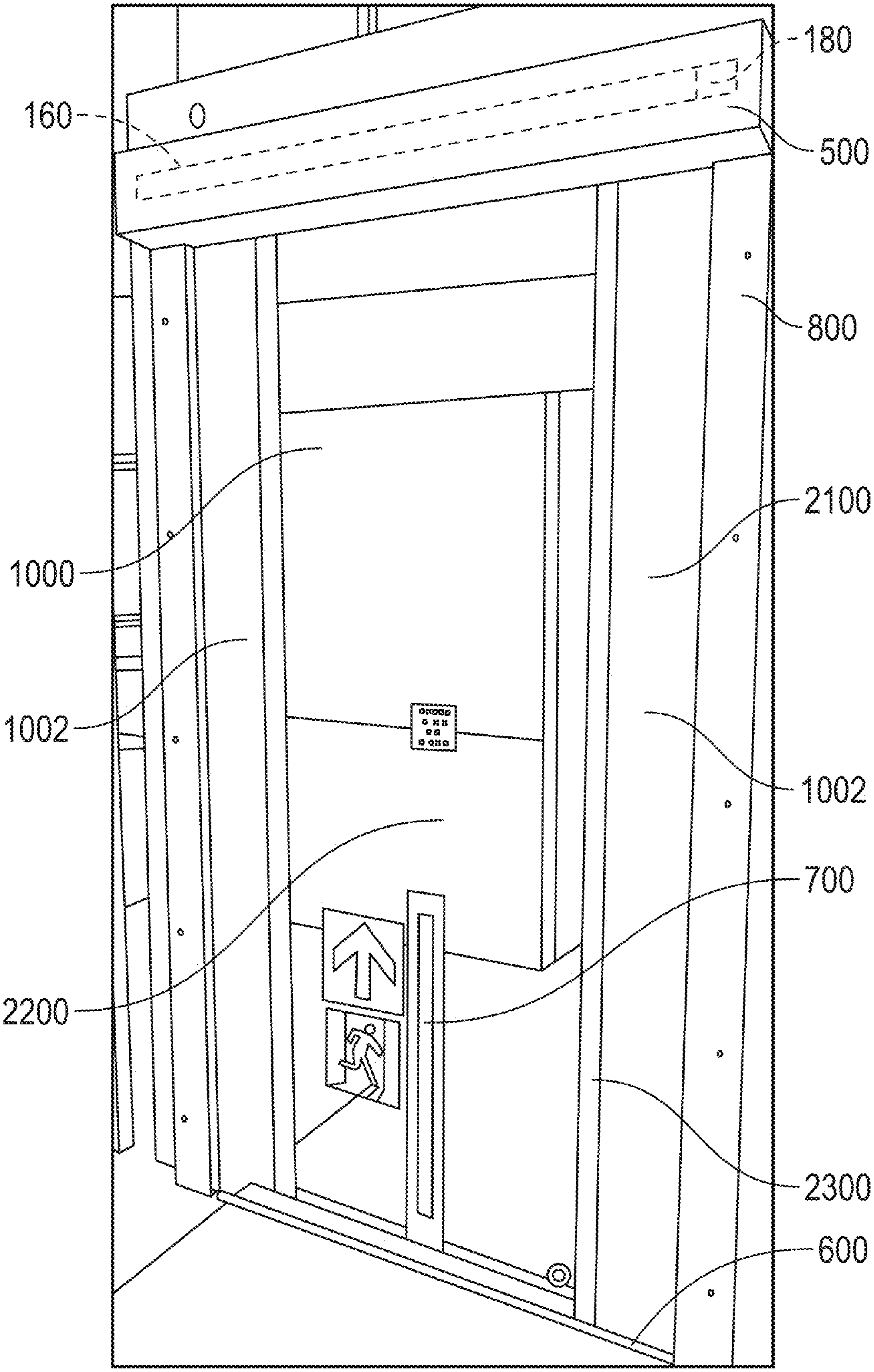

FIGS. 1(*a*) and 1(*b*) illustrate a deployable barrier system 100 for blocking transmission of smoke or fire of an embodiment of the present technology. The barrier system 100 includes a flexible barrier 1000 that can be rolled up into a retracted position in the housing 500 or hanging in a deployed position, as illustrated. There is also a bottom bar

600 and a lifting strap 700 to assist manual egress of the flexible barrier 1000. The flexible barrier 1000 has a barrier retention system 900 attached to the two opposing sides of the flexible barrier 1000. The barrier retention system 900 is designed to slide into or along a pair of side guides 800 (FIG. 2) as the flexible barrier 1000 moves between the retracted and deployed positions.

The illustrated embodiment in FIG. 1(*b*) includes a partially transparent smoke rated barrier assembly that complies with the transparency requirements of ASME A17.1 section 2.11.6.3(d). At least a portion of the barrier 1000 is transparent when the barrier is closed (i.e., in the deployed position), so that one can see through the portion of the barrier between the elevator hoistway to the landing when additional doors or devices (e.g., a fire or smoke barrier) are in the closed or deployed position. ASME A17.1 section 2.11.6.3(d) is intended to allow firefighters to see the elevator landing or lobby when the hoistway door is no more than one quarter open.

The barrier 1000 of some embodiments is comprised of transparent polyamide film 2200 in the central portion of barrier 1000. The transparent polyamide film 2200 in some embodiments is reinforced with fiberglass scrim. Transparent polyamide film 2200 reinforced with fiberglass scrim is available commercially from DAF Products Inc. under the trade name Daflite 100NF. The transparent polyamide film 2200 can be bordered on both sides by strips of e-glass and stainless steel fabric 2100. In some embodiments, the e-glass and stainless steel fabric 2100 are coated with a polyurethane. E-glass and stainless steel fabric coated with a polyurethane is available commercially from Klevers Gmbh & Co. KG under the trade name 660 V4A-2 Karo Gw 2-13.

The transparent polyamide film 2200 and e-glass and stainless steel fabric 2100 overlap each other and are attached together using pressure sensitive adhesive (PSA) 2300. In some embodiments, the PSA 2300 is combined with a Kevlar thread combination. The PSA 2300 is available commercially from 3M under the trade name VHB. In some embodiments, it is combined with a para-aramid synthetic fiber thread available under the trade name Kevlar from Dupont. The seam can be made by overlaying the Daflite 100NF and the 660 V4A-2 Karo Gw 2-13 by approximately 1.5 inches and securing them together with an inch strip of the VHB between them, rolling the joint with a hard rubber roller, and then applying a 1" double seam of Kevlar thread to secure the two together permanently.

Figure 2:
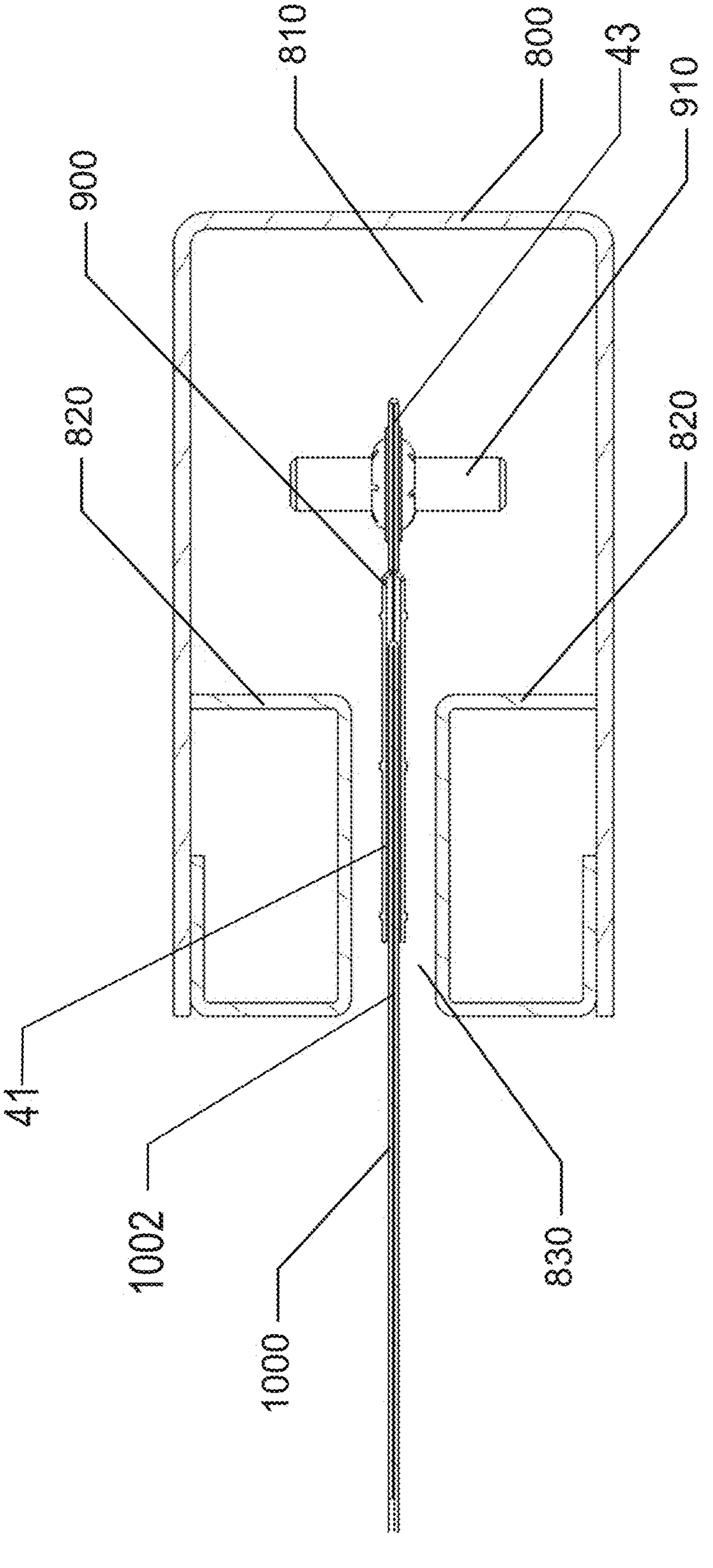
FIG. 2 is a top view of a barrier retention system of an embodiment of the present technology.

FIG. 2 is a top view of the barrier retention system 900 of an embodiment of the present technology. The barrier retention system 900 captures the side edge portions of a flexible barrier 1000, such as a smoke curtain or other smoke and/or fire-resistant barrier, inside a pair of spaced apart side guides 800 when the flexible barrier 1000 is in the deployed position. Each unit of the barrier retention system 900 includes a fire-resistant fabric strip 10, a rod 20, fasteners 30, and a tab 40. The spaced apart side guides 800 are positioned next to a hoistway door, a walkway, passageway, or other opening in a structure. Each side guide 800 has a channel 810 and a slot 830. The barrier retention system 900 slides along the channel within the side guide and the barrier retention system 900 and the side edge portions of the barrier 100 cannot be pulled out of the channel 810 because the slot 830 is narrower than the channel 810 and also narrower than the length of the rod 20. This configuration prevents the flexible barrier 1000 from being pulled away from the side guides 800, even if the fire screen 1000 is pushed by a pressured environment, such as air or smoke, which would try to pull the side edge portions of the barrier 1000 out and away from the side guides. In such a case, the rods 20 are slidably captured within the channels 810 of the side guides 800 and are unable to be pulled through the slot 830, preventing the tab 40 and the side edge portions of the flexible barrier 1000 from pulling out of the side guides 800. This retention of the sides of the barrier in the side guides helps minimize airflow or other gas flow around side edge portions of the barrier 1000 when in the deployed position, even when the barrier 1000 is in a pressurized environment.

In at least one embodiment shown in FIG. 2, the slot 830 of a side guide 800 is formed by two spaced-apart blockers 820 positioned along the walls of the side guide 800. Some conventional prior art screens have been constructed with an enlarged edge, buttons, or other retention mechanisms that are captured in side guides are known in the art. An example is the "FC2" product from BLE. However, the conventional retention mechanisms used in the prior art side guides have the problems discussed above.

Figure 3:
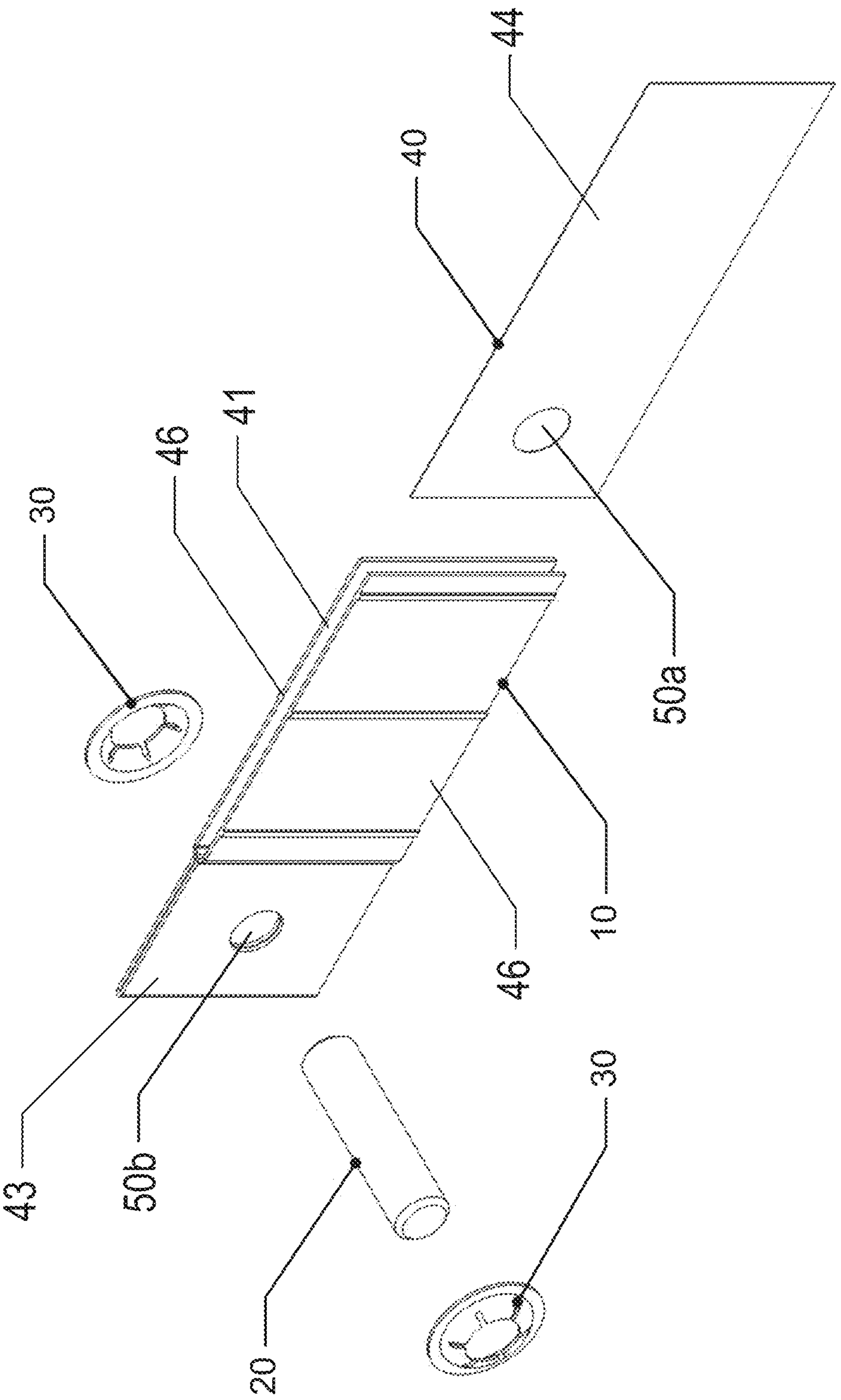
FIG. 3 is a partially exploded isometric view of the barrier retention system of an embodiment of the present technology.

FIG. 3 is a partially exploded view of the barrier retention system 900 of an embodiment of the present technology. The barrier retention system 900 of the illustrated embodiment has a plurality of tabs 40 spaced apart along the side edge portions 1002 of the barrier 1000 and configured to extend through the slot 830 into the interior channel 810 of the associated side guide 800. Each tab 40 has a proximal end portion 41 connected to the first or second side edge portion 1002 of the barrier 1000, and a distal end portion 43 spaced apart from the respective first or second side edge portion 1002. The tab 40 is formed by an internal reinforcement segment 44 with a first aperture **50*a* adjacent to the distal end 43. Fire-resistant fabric strips 46 cover the internal reinforcement segment 44, and each fabric strip 46 has another aperture 50*b* axially aligned with the aperture 50*a* in the internal reinforcement segment 44. The rod 20 or other retention pin extends through the aligned apertures 50*a* and 50*b* in the distal end portion 43 of the respective tab 40, so that the rod 20 is substantially normal to the distal end of the tab. The length of the rod 20 is greater than the width of the slot 830 but less than the width of the internal channel 810 of the side guide 800. Accordingly, the tabs 40 on both sides of the barrier with the tabs' internal reinforcement segments stand proud away from the respective side edge portion 1002 of the barrier 1000, so the distal end portion 43 and the rod 20 of the tab are slidably translatable within the channel 810 of the side guide 800 as the barrier is moved toward or away from the deployed position. The rods 20 within the channels 810, however, block the tabs 40 and the barrier side edge portions from being pulled out of the side guide through the slot 830, even if the barrier is in a pressurized environment on one side of the barrier. This keeps the side edge portions 1002 of the barrier 1000** immediately adjacent to the respective first and second side guides.

In the illustrated embodiment, the internal reinforcement segment 44 of the tab 40 is a sheet metal tab (e.g., 0.004-in. thick 301 half-hard piece of sheet metal) with an aperture **50*a* and can be cut into the illustrated shape using a waterjet cutting machine. The internal reinforcement segment 44 of the tab 40 is inserted between pieces of fire-resistant fabric 10, which can be a unitary piece of fabric that is then folded over to entirely cover and enclose both sides of the internal reinforcement segment 44. The rod 20 is then inserted into the apertures 50*a* and 50*b* in the distal end portion 43 of the tab. The aperture 50*b* in the fire-resistant fabric 10 can be formed by using a punch or an awl or other cutting mechanism. The rod 20 is held in position perpendicular to the internal reinforcement segment 44 and the fabric covering by fasteners 30**.

Figure 4A:
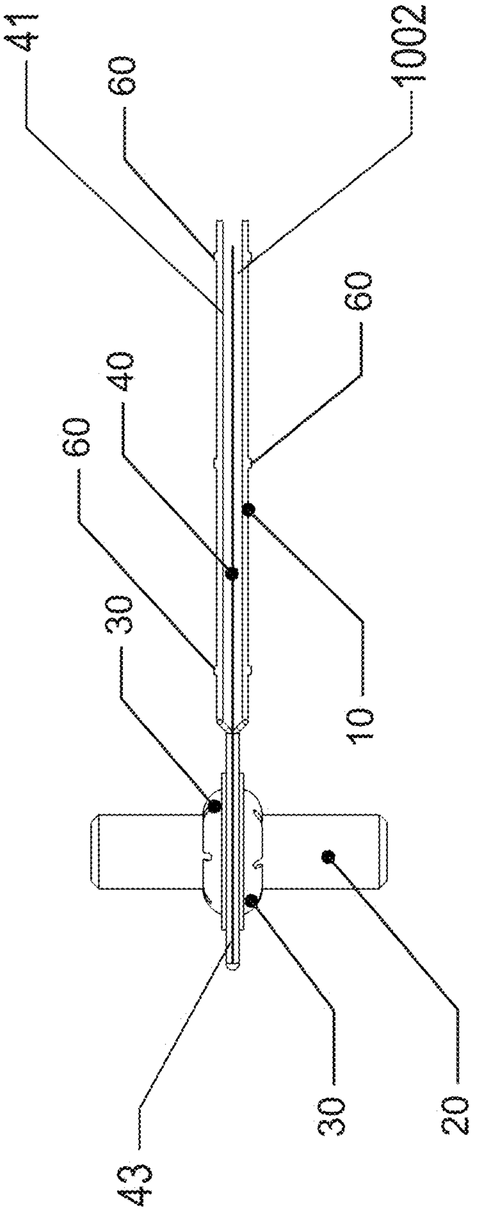
FIG. 4(*a*) is a top view of the barrier retention system of an embodiment of the present technology.
Figure 4B:
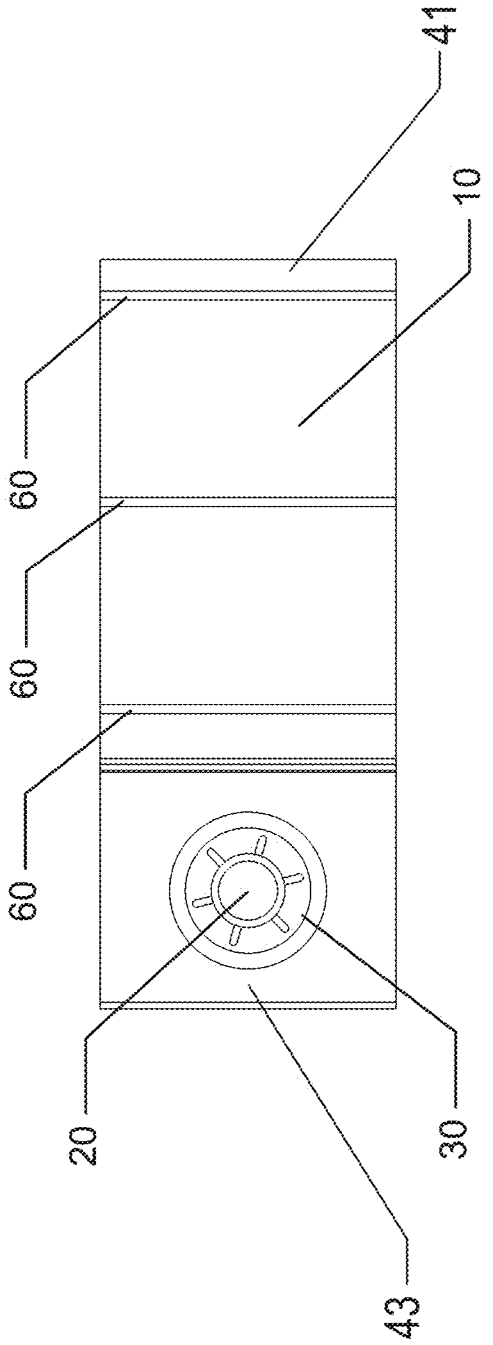
Figure 5:
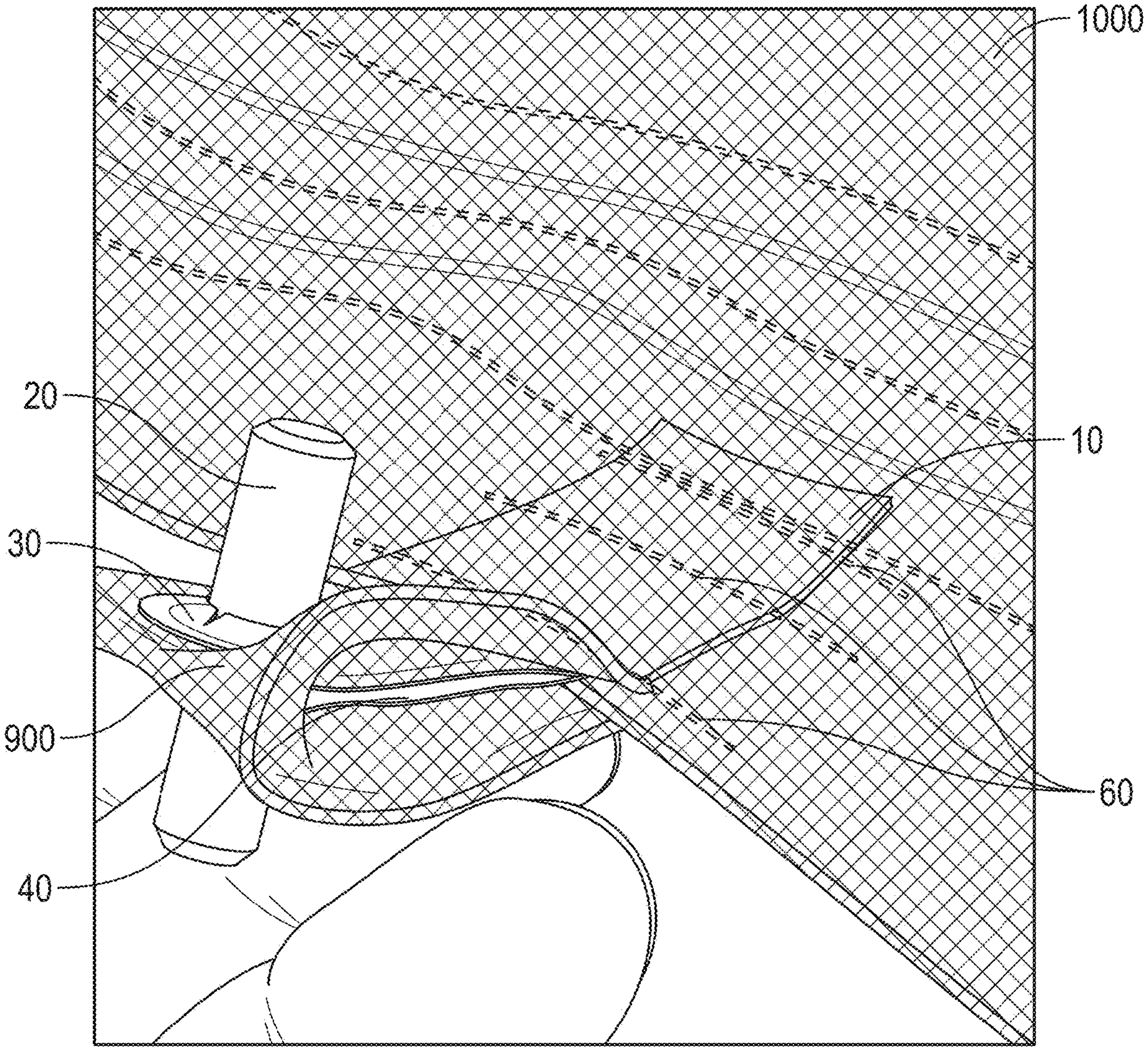
FIG. 5 is an isometric view of the barrier retention system attached to a flexible barrier of an embodiment of the present technology.

FIGS. 4(*a*) and 4(*b*) show top and plan views of the assembled barrier retention system 900. FIG. 5 shows the assembled barrier retention system 900 attached to the flexible barrier 1000 of an embodiment of the present technology. In the illustrated embodiment, the barrier retention system 900 is attached to the side edge portions 1002 of the barrier 1000 via stitches 60 that anchor the proximal end 41 of the tab 40 to the barrier with the tab 40 and its internal reinforcement segment 44 substantially coplanar with the barrier while projecting away from the sides of the barrier. The stitching 60 of the illustrated embodiment can penetrate the layer of the fire-resistant fabric and the metal internal reinforcement segment 44 (or other stiff material) so the tabs 40 stand proud with the rod 20 securely held perpendicular to the barrier's side edge portion. The tab 40 and the fabric 10 may be attached to the flexible barrier 1000 before the rod 20 is secured on the tab 40, or vice versa. The fasteners 30 in the illustrated embodiment are two stud push washers, which are fastened using a metal fixture and a push nut installation tool using one push washer per side, anchoring the outer end of the assembly together. In some embodiments, the rod 20 is about one inch long and about 0.25 inches in diameter.

Figure 6:
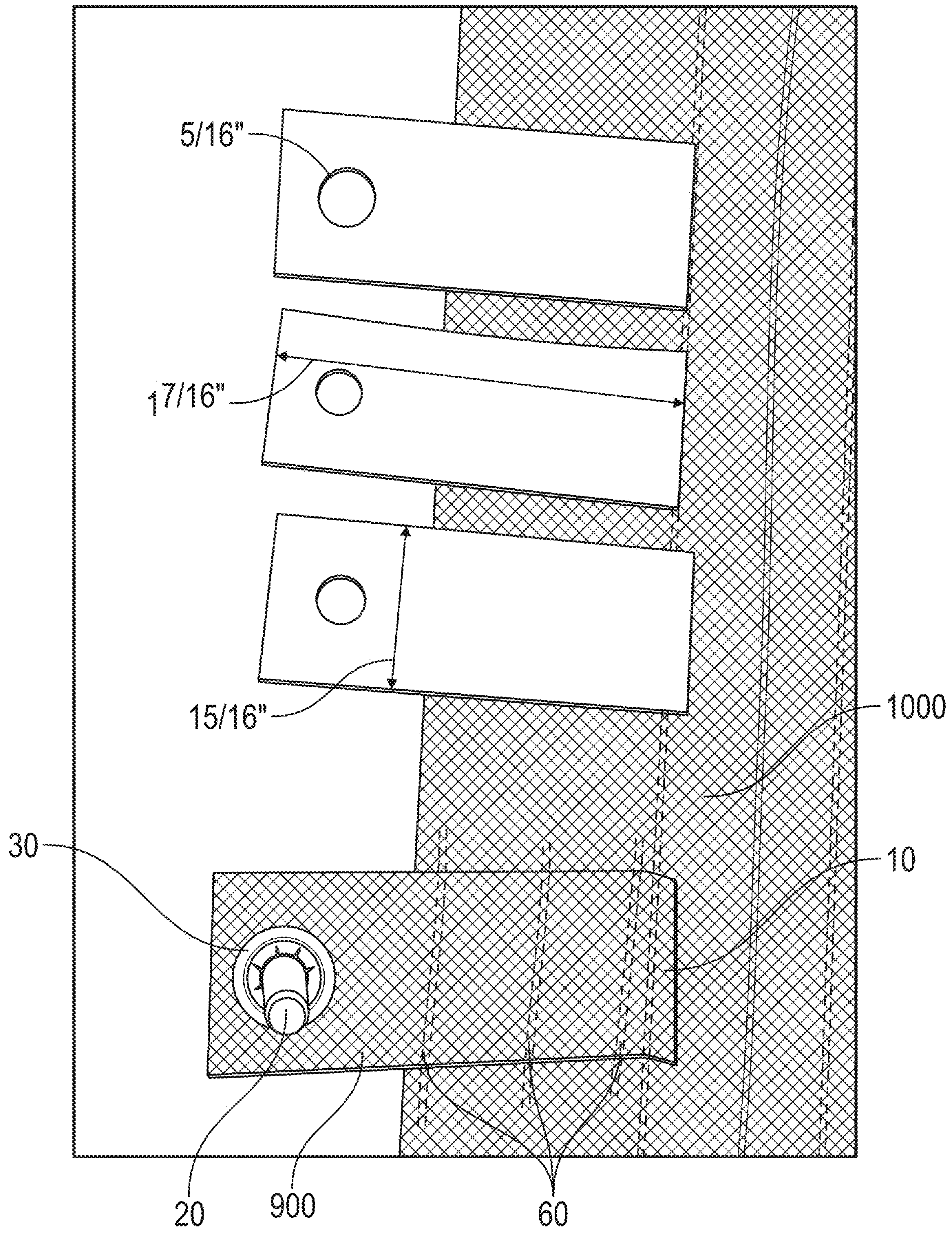
FIG. 6 is a plan view of the barrier retention system attached to the flexible barrier in FIG. 5 and of different embodiments of a plurality of tabs of the present technology.
Figure 7A:
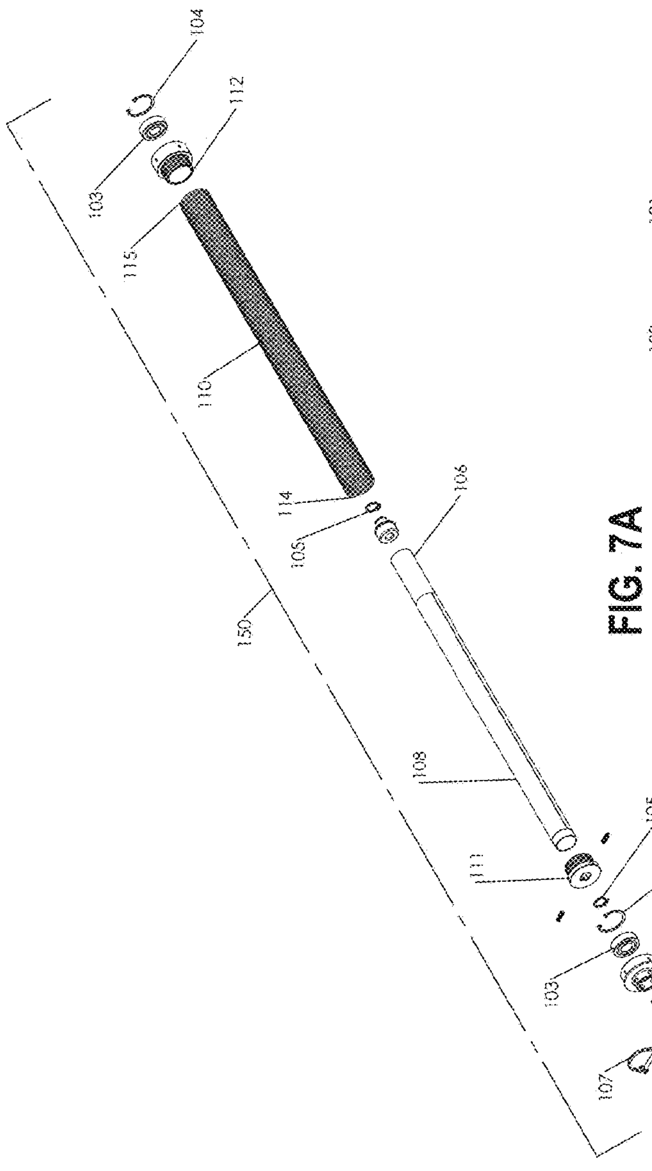
FIG. 7(*a*) is a partially exploded isometric view of a screen egress system of an embodiment of the present technology.
Figure 7E:
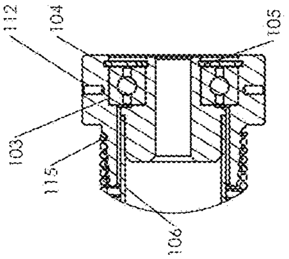
Figure 7D:
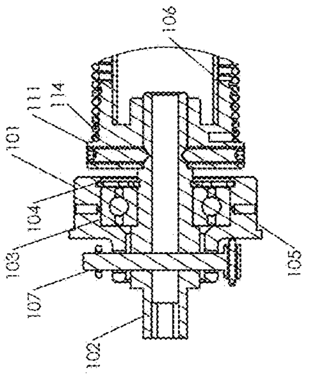
Figure 7C:
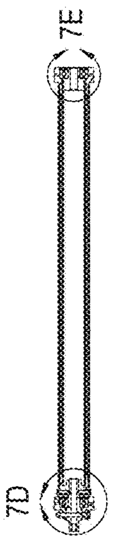
Figure 7B:
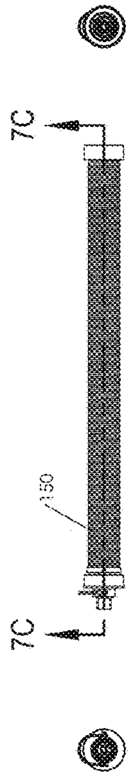

FIG. 6 illustrates the barrier retention system 900 stitched onto the flexible barrier 1000, along with three different samples of a metal internal reinforcement segment 44 of the tab 40. As illustrated, the tabs 40 may have various dimensions.

Embodiments of the present technology provide the deployable barrier system 100 that can deploy the flexible barrier 1000 from a housing 500 (FIG. 1) to temporarily cover a hoistway door, a walkway, passageway, or other opening in a structure for blocking transmission of smoke, fire, noxious gas, air, etc., from moving around or past the barrier 1000. The flexible barrier 1000 is coupled to a collector core, which is formed in the illustrated embodiment by a barrel portion 160 rotatably contained in the housing 500 adjacent to the side guides 800 (FIG. 1). The flexible barrier 1000 is moveable between retracted and deployed positions, wherein the flexible barrier 1000 is rolled onto the barrel 160 and contained within the housing 500 when the barrier 1000 is in the retracted position. When the barrier 1000 is in the deployed position, the barrier 1000 is at least partially unrolled from the barrel 160 and extending downwardly from the housing, so the free end of the barrier 1000 is sealably positioned along the floor or other structure adjacent to the ends of the side guides positioned away from the housing. The barrel 160 is rotatable within the housing 500 in opposing first and second positions to wind the barrier 1000 onto or off of the barrel 160. For example, rotation of the barrel 160 in the first direction, such as upon activation of a motor coupled to the barrel 160, acts to roll the barrier 1000 onto the barrel portion to move the barrier away from the deployed position to the retracted position.

In some embodiments, the barrel 160 and the barrier 1000 are configured so the barrier 1000 can drop or otherwise move under at least the force of gravity from the retracted position to the deployed position causing the barrel 160 to rotate in the second direction. In some embodiments, the barrier 1000 may be configured to be actively driven toward the deployed position upon activation of the motor so as to positively rotate the barrel 160 in the second direction. In the event of power loss, the barrier 1000, the barrel 160, and/or the motor can be configured to allow the barrier 1000 to move to the deployed position solely under the force of gravity.

The barrier system 100 has the barrier retract assist system, also referred to as the screen egress system 150, configured to assist a user in manually moving the barrier from the deployed position toward the retracted position with at least a portion of the barrier being rolled onto the barrel portion for egress past the barrier. The retract assist system is concentrically positioned within the interior area of the barrel 160 and is configured to provide an upward urging force that assists in lifting the barrier when a user manually lifts the barrier away from the deployed position.

FIGS. 7(*a*) through 7(*e*) illustrate the screen egress system 150 of an embodiment of the present technology. The screen egress system 150 includes an inner shaft 106 that has opposing first and second end portions 104 and 105. The inner shaft 106 can have a low-friction material 108, such as Teflon or other highly lubricious material around the inner shaft's outer surface. The illustrated embodiment has a torsion spring 110 coaxially coiled around the outer surface of the inner shaft 106. One end portion of the torsion spring 110 is an idle end portion 114, and the other end is a rotating end portion 115. Although the illustrated embodiment shows a torsion spring 110 about the inner shaft, other embodiments can use one or more other urging members.

As shown in FIGS. 7(*a*) and 7(*d*), the illustrated embodiment has a first attachment member 111 fixedly attached to one end of the inner shaft 106 and also to the idle end portion 114 of the torsion spring 110. The first attachment member 111, the inner shaft 106, and the idle end portion 114 of the spring are fixed and do not rotate relative to the housing upon rotation of the barrel 160 and movement of the barrier 1000 (FIG. 1) between the retracted and deployed positions. In the illustrated embodiment, a bearing member 111 is coaxially connected to the first attachment member and is fixedly attached to a first portion of the barrel 160. The bearing member 111 allows the barrel 160 to rotate within the housing 500 in the first and second directions relative to the first attachment member and relative to the idle end portion of the torsion spring 110 as the barrier 1000 moves between the retracted and deployed positions.

This fixing of the idle end portion 114 of the torsion spring 110 allows the spring to wind via the rotating end portion 115 to create a rotational spring force in the torsion spring. More specifically, as shown in FIGS. 7(*a*) and 7(*e*), a second attachment member 112 is rotatably coupled to the second end portion of the inner tube 106 and fixedly attached to a second portion of the barrel portion 160. The second attachment member 112 is also connected to the rotating end portion 115 of the torsion spring 110. The second attachment member 112 rotates with the barrel 160 relative to the housing 500 (FIG. 1) as the barrier 1000 moves between the retracted and deployed positions. In the illustrated embodiment, a second bearing member 103 is fixedly attached to the other end of the inner shaft 106 and is rotatably mounted within the second attachment member 112. In some embodiments, the first and second bearing members 101 and 103 are ball bearings, although other bearing features that allow rotation of the selected associated components can be used.

This arrangement of the concentrically aligned inner tube 160 surrounded by the torsion spring 110 within the barrel 160, along with the attachment members 111 and 112 and bearings are configured to wind the spring 110 relative to the inner tube 160. The torsion spring 110 is typically spaced slightly apart from the surface of the inner shaft 106, but in the event the torsion spring 110 contacts the inner shaft 106 during operation, the Teflon provides a lubricious interface, so friction will not impede rotation of the portion of the torsion spring 110 relative to the inner shaft 106. When the barrel 160 rotates in the first direction, the barrier 1000 moves to the deployed position to create a spring force stored in the wound torsion spring. This spring force assists movement of the barrier 1000 from the deployed position toward the retracted position when a user engages the barrier, such as via a lifting strap, and applies a lifting force to the barrier 1000. This allows the user to smoothly and easily lift or otherwise raise the barrier 1000 away from the deployed position to allow for manual egress past the barrier.

In the illustrated embodiment, the screen egress system 150 includes a preload axle 102 coupled to the first attachment member 111, and a first bearing member 101 is coaxially coupled to the first attachment member 111. As discussed in greater detail below, the preload axle 102 is configured to help in tuning the screen egress system 150 during manufacture and/or installation to partially preload the torsion spring 110 when the barrier 1000 is in the retracted position. This preloading of the torsion spring 110 sets the spring so that, as the barrier 1000 is deployed from the retracted position to the deployed position, a desired urging force is generated in the torsion spring 110 as the barrier 1000 lowers to the deployed position. Once the screen egress system 150 is tuned, the preload axle 102 is fixed in place and does not move relative to the housing and the idle end portion of the torsion spring 110.

Figure 8:
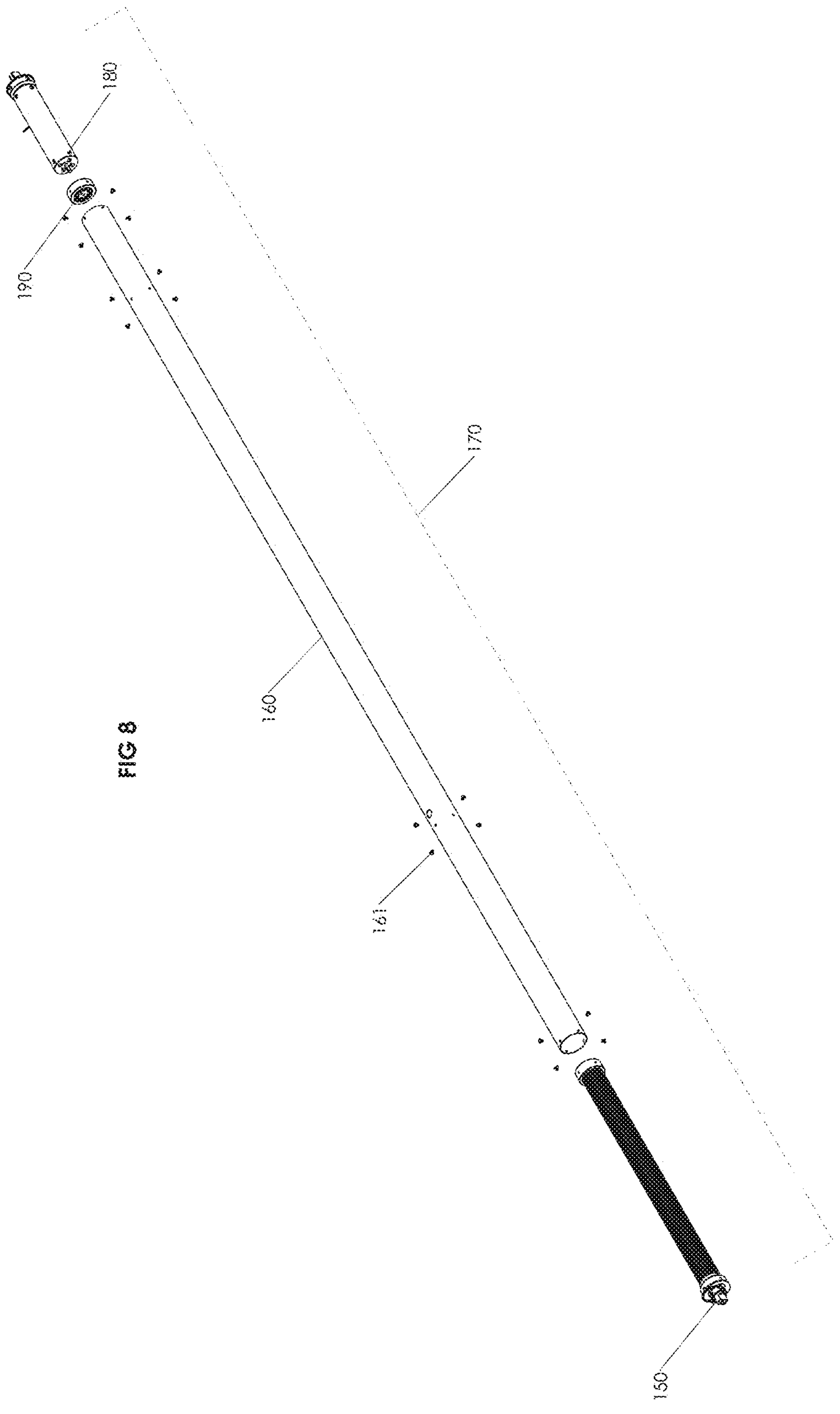
FIG. 8 is a partially exploded isometric view of the system, the barrel portion, the one-way bearing member, and the motor of an embodiment of the present technology.

FIG. 8 shows a partially exploded view of the barrier deployment and retraction system 170 of one embodiment of the present technology. The barrier deployment and retraction system 170 includes the screen egress system 150, the collector core shown as a barrel portion 160, a motor 180, and a one-way clutch or bearing member 190. The flexible barrier 1000 may be rolled around and collected onto the barrel portion 160 in its retracted position. When assembling the barrier deployment and retraction system 170, the screen egress system 150 is inserted into one end of the barrel portion 160. The first bearing member 101 and the second attachment member 112 are coupled to the barrel portion 160 using screws or other fasteners 161. The motor 180 and the one-way bearing member 190 are inserted into and coupled to the other end of the barrel portion 160 using screws or other fasteners 161. The motor 180 is then fixedly mounted within the housing 500 (FIG. 1). In the illustrated embodiment, the screen egress system 150 is then tuned to pre-load the torsion spring 110 while the barrier 1000 is in the retracted position and while the spring's rotating end portion 115 is stationary. This tuning includes rotatably adjusting the preload axle 102 to cause a preloaded torsional force in the torsion spring 110 before the barrier moves away from the retracted position. This can be done using a commercially available ratchet tool for rotational engagement with the preload axle, although other tools or engagement configurations could be used. Since the second attachment member 112 is coupled to the barrel portion 160, rotating the preload axle will cause the torsion spring 110 to wind relative to the inner shaft 106. A preload pin 107 is then inserted through both the preload axle 102 and the first bearing member 101 fixing the two features together to prevent inadvertent rotation between them during operation of the barrier system. In some embodiments, after the torsion spring 110 is preloaded, the preload axle 102 can be fixedly attached to the housing or other stationary structure when the barrier assembly is installed adjacent to a hoistway door, a walkway, passageway, or other opening in a structure, such that the preload pin 107 can be removed from the preload axle 102.

The flexible barrier 1000 on the barrel portion 160 is moveable between the retracted and deployed positions. It is rolled onto the barrel portion 160 and contained in the housing when it is in the retracted position, while it is unrolled and at least a portion of it extends downward from the housing when it is in the deployed position. While in the retracted position, upon an emergency, the flexible barrier 1000 falls to the deployed position from at least the force of gravity, causing the barrel portion 160 to rotate in one direction. Once the emergency has ended, the motor 180 rolls the tubular member 160 and the flexible barrier 1000 in the other direction, causing the flexible barrier 1000 to switch back from the deployed position to the retracted position. In some embodiments, the torsion spring 110 provides the urging force for moving the barrier away from the deployed position. Accordingly, the spring's urging force can also act to assist the motor 180 in rolling the barrier to the deployed position. As the spring assists the motor, the motor may not need be as powerful, so lighter weight, less expensive motors may be suitable for use with the deployable barrier system.

In some embodiments, the barrel portion 160 is available commercially from bulk steel tube suppliers under product names ERW, DOM, or seamless steel tube. The motor 180 is available commercially from KAG-Hannover under product name M42x30. The one-way bearing member 190 is available commercially from Formsprag Clutch under product name CSK20PP. The first and second attachment members 111 and 112 may be spring winding cones, in which case the torsion spring 110 is threaded onto their tapered ends. They also function to keep the inner shaft 106, the torsion spring 110, the barrel portion 160, and the first and second bearing members 101 and 103 concentric. Concentricity of the torsion spring 110 inside the barrel portion 160 significantly supports its intended function of applying a linear torque to the barrel portion 160 throughout its range of motion. Friction between the spring 110 and each of the screw cones 111 and 112 ensures that the spring 110 is retained on each screw cone. Additional fastening methods to couple the spring to each screw cone may be employed.

Different springs can be used to accomplish different linear rates of torque output for revolution. A number of different versions of the spring 110 exist, each with a different spring rate. They may vary in length, coil diameter, and wire gauge to produce different spring rates. Spring rate is a constant rate of increasing torque output per additional revolution of deflection, which is an inherent, unalterable trait of a spring based on the specifics of its manufacture. Each version of the spring 110 can be matched to a range of barrier products depending on each corresponding barrier's total mass, dimensions, and fabric type.

The preload of the torsional spring 110 discussed above can be applied to the retract assist system 150 to offset the weight of a bottom bar 600 of the barrier 1000 if that weight exceeds the vertical force desired to lift the barrier 1000 via the lift strap 700 to perform a manual egress. Since the flexible barrier 1000 must deploy entirely by the force of gravity in the event of a loss of electrical power, the output torque from the spring 110 must not overpower the barrier's ability to deploy by its own weight. Thus, each type of barrier must be paired with a type of spring 110 and a prescribed amount of spring preload corresponding to its variable properties.

Each spring's design allows for a sufficient number of revolutions to accommodate preload and barrier deployment. During deployment of the barrier 1000, the first attachment member 111 and the end of the spring 110 fixedly attached to it remain stationary while the second attachment member 112 and the end of the spring 110 fixedly attached to it rotate at a rate equal to the rate of rotation of the barrel portion 160. The total number of spring rotations required for operation is the sum of the preload rotations and the number of barrel portion 160 rotations that occur when the installed flexible barrier 1000 fully deploys to the floor.

Each barrier 1000 is made to order in either fire-rated or smoke-rated versions by fabricating each barrier 1000 using the qualified materials appropriate for each application. Barriers vary drastically in size depending on the customer's requirements. Each barrier's mass is thus determined by both its dimensional size and the type of fabric material(s) that constitute it.

Accordingly, with different types and sizes of barriers there is a necessity to custom manufacture and/or install variations of retract assist system 150. Below is an example of one such barrier and spring assembly combination.

EXAMPLE

Barrier size=120" wide by 120" high (10 ft W×10 ft H). This refers to the clear opening dimensions, and the barrier is slightly oversized to effectively create a barrier.

Barrier material=SGTEX30 having a 2-hour fire-endurance rating in compliance with UL10D. This barrier is available from SmokeGuard of Boise, Idaho.

Spring=Smoke Guard torsion spring part #36158, having a constant rate of 2.1 in-lb per revolution when torqued in the opposite direction of the spring winding. The spring length is determined by the requirements of torque increase rate per revolution, diametric clearance constraints, wire diameter, and number of preload turns required.

The length of the inner shaft is determined by the width constraint of the opening where the deployable fire or smoke barrier system is being installed, and also by spring length and spring wire diameter. In this particular example, the number of preload turns required to balance the barrier is 12.

The preload on the spring 110 can be adjusted on site if necessary, using commonly available hand tools. The spring preload can be set (locked in place) using a commercially available pin 107, such as a wire-lock clevis pin. Once the barrier deployment and retraction system has been installed in the housing and is ready for deployment, the pin 107 can be removed to allow normal function of the unit.

The screen egress system 150 allows for wires (not shown) to pass through the barrel portion 160 and the barrier deployment and retraction system 170 to power either a barrier-retracting switch located on the barrier, an obstruction-sensing edge sensor located on the bottom bar, or both.

In screen/motor assemblies, a commonly used controller is the Texas Instruments DRV8702 motor driver chip. One pin on the DRV8702, nSLEEP, controls the activation of the motor driver chip and ultimately how the controller responds to the motor being back driven during a loss of power.

With nSLEEP activated, the bridge acts as a brake. Activation of the motor driver chip is one of the reasons why prior art units had to add weight to their products to get a power failure deploy within specifications. However, to get an optimum manual egress screen assembly using a lifting aid, adding additional weights to the bottom of the screen to get a reliable deploy is not an option as this would counter the goal of keeping the effective egress lifting weight less than 15 pounds.

In at least one embodiment, the solution is to place the bridge in a freewheeling state during loss of power, allowing for a controlled deployment that will eliminate the need for added weights while increasing the reliability of a no power deploy. In some embodiments, the bridge is an H-bridge arrangement of MOSFETs, which is a series of 4 switches that control the flow of current into the motor in two selectable directions. The chain of command is microcontroller>motor driver chip>bridge>motor. In the case of the DRV8702, this can be done by disabling the motor driver and modifying the code so it is activated when the microcontroller is awake and senses that power is present. These two changes mean that the default state of the bridge is to allow the motor to coast, and only once the microcontroller is alive and has verified an AC and Battery power failure does it activate the motor driver chip and control the barrier's deployment.

An additional improvement to the motor assembly and electronics allows the controller to properly power up using the power generated from back driving the motor (i.e., turning kinetic energy into electrical energy). This is achieved by enabling brown out detection that will force the microcontroller to reset whenever its supply voltage drops below 3.2V. This is required as the voltage generated from back driving the motor is initially unreliable. Using RC filtering and catch diodes on the motor line, voltages generated from a power failure deploy are conditioned and routed back to power rails. Since the system is now awake and has voltage capable of controlling the deployment, the controller goes into a closed loop and begins controlling the barrier's deployment velocity.

The invention in its broader aspects is not limited to the specific details of the preferred embodiments shown and described, and it will be appreciated that variations and modifications can be made without departing from the scope of the invention.

It will be apparent to those having skill in the art that changes may be made to the details of the above-described embodiments without departing from the underlying principles of the present disclosure. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. Additionally, the term "comprising," "including," and "having" should be interpreted to mean including at least the recited feature(s) such that any greater number of the same feature and/or additional types of other features are not precluded.

Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numbers expressing used in the specification and claims, are to be understood as being modified in all instances by the term “about.” Accordingly, unless indicated to the contrary, the numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of “1 to 10” includes any and all subranges between (and including) the minimum value of 1 and the maximum value of 10, i.e., any and all subranges having a minimum value of equal to or greater than 1 and a maximum value of equal to or less than 10 (e.g., 5.5 to 10).

The following are non-limiting examples of aspects of the present technology, although the technology disclosed in this specification supports other examples of the technology.

Example 1. A deployable barrier system for blocking transmission of smoke or fire, comprising:

- a housing;
- a barrel portion contained in the housing and being rotatable in opposing first and second directions;
- a motor coupled to the barrel portion and activatable to rotate the barrel portion in at least the first direction;
- a flexible barrier coupled to the barrel portion and moveable between retracted and deployed positions, wherein the flexible barrier is rolled onto the barrel portion and contained within the housing when the flexible barrier is in the retracted position, and the barrier is unrolled from the barrel portion and with at least a portion extending downwardly from the housing when the barrier is in the deployed position, wherein rotation of the barrel portion in the first direction upon activation of the motor is configured to roll the barrier onto the barrel portion to move the barrier from the deployed position to the retracted position, and the barrier being moveable under at least the force of gravity from the retracted position to the deployed position causing the barrel portion to rotate in the second direction; and
- a retract assist system configured to assist a user in manually moving the barrier from the deployed position toward the retracted position with at least a portion of the barrier being rolled onto the barrel portion for egress past the barrier, wherein the retract assist system is positioned in the barrel portion, the retract assist system comprising:
  - an inner shaft with opposing first and second end portions;
  - a spring member positioned about the inner shaft and having an idle end portion and a rotating end portion;
  - a first attachment member fixedly attached to the first end portion of the inner shaft and to the idle end portion of the spring member, wherein the first attachment member, the inner shaft, and the idle end portion of the spring member are configured to be fixed and to not rotate relative to the housing upon rotation of the barrel portion and movement of the barrier between the retracted and deployed positions; and
  - a second attachment member rotatably coupled to the second end portion of the inner shaft and fixedly attached to a second portion of the barrel portion and to the rotating end portion of the spring member, wherein the second attachment member rotates with the barrel portion relative to the housing as the barrier moves between the retracted and deployed positions;

wherein the retract assist system is configured to wind the spring member relative to the inner shaft when the barrel portion moves in the first direction and the barrier moves to the deployed position to create a spring force configured to assist movement of the barrier from the deployed position toward the retracted position when a user applies a lifting force to the barrier to allow for manual egress past the barrier.

Example 2. The deployable barrier system of Example 1, further comprising a preload axle attached to the first attachment member and adjustably rotatable to cause a preloaded torsional force in the spring member before the first attachment member and the idle end portion of the spring member are fixed in position relative to the housing.

Example 3. The deployable barrier system of Example 1, further comprising a bearing member coaxially coupled to the first attachment member and fixedly attached to a first portion of the barrel portion, the bearing member configured to allow the barrel portion to rotate in the first and second directions relative to the first attachment member and to the idle end portion of the spring member.

Example 4. The deployable barrier system of Example 1 further wherein the barrel portion, the inner shaft, and the spring member are concentric.

Example 5. The deployable barrier system of Example 1 wherein the flexible barrier comprises a lifting strap at a bottom portion, wherein the user applies the lifting force to the lifting strap, wherein the lifting force is assisted by the spring force to move the barrier away from the deployed position to allow for manual egress past the barrier.

Example 6. The deployable barrier system of Example 1 wherein the spring member is a torsion spring.

Example 7. The deployable barrier system of Example 6 wherein the first attachment member is a first spring winding cone, and the second attachment member is a second spring winding cone.

Example 8. The deployable barrier system of Example 1 wherein the bearing member is a first bearing member and wherein the deployable barrier system further comprises a second bearing member fixedly attached to the second end portion of the inner shaft, coaxially coupled to the second attachment member, and configured to allow the barrel portion to rotate in the first and second directions relative to the inner shaft.

Example 9. The deployable barrier system of Example 8 wherein the first and second bearing members are ball bearings.

Example 10. The deployable barrier system of Example 1 further comprising a preload retention member configured to fixedly attach the first bearing member to the preload axle after the preload axle causes the preloaded torsional force in the spring member, and configured to be removed after the first attachment member and the idle end portion of the spring member are fixed in position relative to the housing.

Example 11. The deployable barrier system of Example 10 wherein the preload retention member is a pin removably inserted into a portion of the preload axle.

Example 12. The deployable barrier system of Example 1 further comprising a one-way bearing member positioned inside the barrel portion and coaxially coupled to the motor.

Example 13. The deployable barrier system of Example 1 wherein the inner shaft has a low-friction material thereon adjacent to the spring member.

Example 14. The deployable barrier system of Example 13 wherein the low-friction material is Teflon.

Example 15. The deployable barrier system of Example 1 wherein the flexible barrier comprises a first side portion and a second side portion, the deployable fire or smoke barrier system further comprising:

opposing first and second side guides spaced apart from each other; and a barrier retention system mounted to the side edge portions of the flexible barrier, the barrier retention system configured to be inside the housing while the flexible barrier is in the retracted position, and to be in the first and second side guides when the flexible barrier is in the deployed position, wherein the barrier retention system comprises a plurality of tabs spaced apart along first and second side edge portions of the barrier and configured to extend into a portion of the first or second side guides, the tabs each have proximal and distal ends, the proximal end being connected to the first or second side edge portion of the barrier, and the distal end being spaced apart from the respective first or second side edge portion of the barrier, each tab comprises;

an internal reinforcement segment with a first aperture adjacent to the distal end;

fire-resistant fabric strips covering the internal reinforcement segment, wherein each fabric strip has at least one second aperture axially aligned with the first aperture on the internal reinforcement segment; and a retention pin extending through the first and second apertures, wherein the retention pin is substantially normal to the distal end of the respective tab, wherein the retention rod is configured to be slidably translatable within the first or second side guide and being blocked from pulling out of the first or second side guide so as to retain the first and second side edge portions of the barrier immediately adjacent to the respective first and second side guides.

Example 16. A deployable barrier system, comprising:

a housing;

a collector core contained in the housing and being rotatable in opposing first and second directions;

a driver coupled to the collector core and activatable to rotate the collector core in at least the first direction;

a barrier coupled to the collector core and moveable between retracted and deployed positions, wherein the barrier is wrapped on the collector core and contained within the housing when the barrier is in the retracted position, and the barrier is at least partially unwrapped from the collector core and extends downwardly from the housing when the barrier is in the deployed position, wherein rotation of the collector core in the first direction is configured to roll the barrier onto the collector core to move the barrier from the deployed position to the retracted position; and a retract assist system configured to assist moving the barrier from the deployed position toward the retracted position with at least a portion of the barrier being rolled onto the collector core for egress past the barrier, wherein the retract assist system is concentrically positioned in the collector core, the retract assist system comprising:

an inner shaft with opposing first and second end portions;

an urging member positioned about the inner shaft and having an idle end portion and a rotating end portion;

a first attachment member fixedly attached to the first end portion of the inner shaft and to the idle end portion of the urging member, wherein the first attachment member, the inner shaft, and the idle end portion are configured to be fixed and to not rotate relative to the housing upon rotation of the collector core;

a bearing coupled to the first attachment member and fixedly attached to a first portion of the collector core, the bearing being configured to allow the collector core to rotate in the first and second directions relative to the first attachment member and the idle end portion of the urging member; and a second attachment member rotatably coupled to the second end portion of the inner shaft and fixedly attached to a second portion of the collector core and to the rotating end portion of the urging member, wherein the second attachment member rotates with the collector core relative to the housing as the barrier moves between the retracted and deployed positions;

wherein the retract assist system is configured to load the urging member when the collector core rotates in the first direction and the barrier moves to the deployed position to create an urging force configured to assist movement of the barrier from the deployed position toward the retracted position when a user applies a lifting force to the barrier to allow for manual egress past the barrier.

Example 17. The deployable barrier system of Example 16 wherein the barrier comprises a lifting strap at a bottom portion configured to allow a user to engage and apply the lifting force to the lifting strap to allow for manual egress past the barrier.

Example 18. The deployable barrier system of Example 16 wherein the urging member is a torsional spring.

Example 19. The deployable barrier system of Example 16 wherein the bearing member is a first bearing member, and the deployable barrier system further comprises a second bearing member fixedly attached to the second end portion of the inner shaft, coaxially coupled to the second attachment member, and configured to allow the barrel portion to rotate in the first and second directions relative to the inner shaft.

Example 20. A method of deploying a fire or smoke barrier system, comprising:

activating the fire or smoke barrier system to deploy a barrier, the barrier system comprises:

a housing;

a collector core contained in the housing and being rotatable in opposing first and second directions;

a driver coupled to the collector core and activatable to rotate the collector core in at least the first direction;

the barrier is coupled to the collector core and moveable between retracted and deployed positions, wherein the barrier is wrapped on the collector core and contained within the housing when the barrier is in the retracted position, and the barrier is at least partially unwrapped from the collector core and extends downwardly from the housing when the barrier is in the deployed position, wherein rotation of the collector core in the first direction is configured to roll the barrier onto the collector core to move the barrier from the deployed position to the retracted position; and a retract assist system configured to assist moving the barrier from the deployed position toward the retracted position with at least a portion of the barrier being rolled onto the collector core for egress past the barrier, wherein the retract assist system is concentrically positioned in the collector core, the retract assist system comprising:

an inner shaft with opposing first and second end portions;

an urging member positioned about the inner shaft and having an idle end portion and a rotating end portion;

a first attachment member fixedly attached to the first end portion of the inner shaft and to the idle end portion of the urging member, wherein the first attachment member, the inner shaft, and the idle end portion are configured to be fixed and to not rotate relative to the housing upon rotation of the collector core;

the bearing coupled to the first attachment member and fixedly attached to a first portion of the collector core, the bearing being configured to allow the collector core to rotate in the first and second directions relative to the first attachment member and the idle end portion of the urging member; and a second attachment member rotatably coupled to the second end portion of the inner shaft and fixedly attached to a second portion of the collector core and to the rotating end portion of the urging member, wherein the second attachment member rotates with the collector core relative to the housing as the barrier moves between the retracted and deployed positions;

wherein the retract assist system is configured to load the urging member when the collector core rotates in the first direction and the barrier moves to the deployed position to create an urging force configured to assist movement of the barrier from the deployed position toward the retracted position when a user applies a lifting force to the barrier to allow for manual egress past the barrier;

allowing the collector core to rotate in the first direction to move the barrier from the retracted position to the deployed position;

winding the rotating end portion of the urging member while the idle end portion remains stationary relative to the housing as the collector core rotates in the first direction and storing the urging force in the urging member when the barrier is in the deployed position;

allowing the barrier to be manually lifted by a user applying a lifting force to the barrier when the barrier is in the deployed position so the collector core rotates in the second direction; and applying the urging force to the collector core as the collector core rotates in the second direction, wherein the urging force combines with the lifting force to assist the user in manually lifting the barrier away from the deployed position to allow the user to egress past the barrier.

Example 21. The method of Example 20, further comprising allowing the barrier to return to the deployed position after the user has egressed past the barrier and restoring the urging force to the urging member as the barrier returns to the deployed position.

Example 22. The method of Example 20 wherein the urging member is a torsional spring, and winding the urging member comprises rotating the torsional spring about an axis of the collector core.

Example 23. The method of Example 23, further comprising adjusting the preloaded torsional force comprises rotating a preload axle that is attached to the first attachment member and adjustably rotatable to cause a preloaded torsional force in the urging member before the first attachment member and the idle end portion of the urging member are fixed in position relative to the housing.

Example 24. A deployable fire or smoke barrier system, comprising:

a housing;

a barrel portion rotatably contained in the housing;

a flexible barrier comprising first and second side portions, wherein the flexible barrier is coupled to the barrel portion and moveable between retracted and deployed positions, wherein the flexible barrier is rolled onto the barrel portion and contained within the housing when the flexible barrier is in the retracted position, and the barrier is unrolled from the barrel portion with at least a portion extending downwardly from the housing when the barrier is in the deployed position, wherein rotation of the barrel portion in the first direction upon activation of the motor is configured to roll the barrier onto the barrel portion to move the barrier from the deployed position to the retracted position, and the barrier being moveable under at least the force of gravity from the retracted position to the deployed position causing the barrel portion to rotate in the second direction;

first and second side guides spaced apart from each other and configured to receive the first and second side portions respectively of the barrier; and a barrier retention system connected to the first and second side portions of the barrier and configured to be at least partially contained in the housing while the barrier is in the retracted position, and to be slidably positioned in the first and second side guides when the barrier is in the deployed position, the barrier retention system comprises:

a plurality of tabs spaced apart along first and second side edge portions of the barrier and configured to extend into a portion of the first or second side guides, the tabs each have proximal and distal ends, the proximal end being connected to the first or second side edge portion of the barrier, and the distal end being spaced apart from the respective first or second side edge portion of the barrier, each tab comprises;

an internal reinforcement segment with a first aperture adjacent to the distal end;

fire-resistant fabric strips covering the internal reinforcement segment, wherein each fabric strip has at least one second aperture axially aligned with the first aperture on the internal reinforcement segment; and a retention pin extending through the first and second apertures, wherein the retention pin is substantially normal to the distal end of the respective tab, wherein the retention rod is configured to be slidably translatable within the first or second side guide and being blocked from pulling out of the first or second side guide so as to retain the first and second side edge portions of the barrier immediately adjacent to the respective first and second side guides.

Example 25. The barrier system of Example 24, wherein the first side guide comprises a first slot and a first channel, the second side guide comprises a second slot and a second channel, and while the flexible barrier is in the deployed position, the first side portion of the fire screen is in the first slot, the second side portion of the fire screen is in the second slot, the plurality of rods on the first side portion is in the first channel, and the plurality of rods on the second side portion is in the second channel.

Example 26. The barrier system of Example 25 wherein a length of the first slot is longer than the distance between the first side portion of the flexible barrier and the plurality of rods in the first channel while the flexible barrier is in the deployed position.

Example 27. The barrier system of Example 26 wherein a length of each of the plurality of rods is greater than a width of the first slot and less than a width of the first channel.

Example 28. The barrier system of Example 24 wherein the internal reinforcement segment is made of metal.

Example 29. The barrier system of Example 24 wherein the fire-resistant fabric strips of each tab are stitched together to enclose the internal reinforcement segment.

Example 30. The barrier system of Example 24 wherein each tab of the plurality of tabs has a push-on fastener connected to the rod and coaxially aligned with the first and second apertures, wherein the push-on fastener retains the rods in position relative to the internal reinforcement segment and the fire-resistant fabric strips.

Example 31. A smoke barrier system usable adjacent to an opening in a structure, comprising:

a housing;

a collector core in the housing and being rotatable in opposing first and second directions;

a barrier having first and second side portions and being coupled to the collector core and moveable between retracted and deployed positions, wherein the barrier is within the housing when the barrier is in the retracted position, and the barrier is at least partially unwrapped from the collector core and extends downwardly from the housing when the barrier is in the deployed position; and a retract assist system concentrically positioned in the collector core, the retract assist system comprising:

an inner shaft with opposing first and second end portions;

a torsional spring positioned about the inner shaft fixed relative to the first end portion, the torsional spring having an idle end portion and a rotating end portion, wherein the idle end portion and the inner shaft do not rotate relative to the housing upon rotation of the collector core; and an attachment member rotatably coupled to the second end portion of the inner shaft and fixedly attached to the collector core and to the rotating end portion of the torsional spring, wherein the second attachment member rotates with the collector core relative to the housing as the barrier moves between the retracted and deployed positions;

wherein the retract assist system loads the torsional spring when the collector core rotates in the first direction and the barrier moves to the deployed position to create an urging force configured to assist movement of the barrier from the deployed position toward the retracted position when a user applies a lifting force to the barrier to allow for manual egress past the barrier; and a fire screen deployment subsystem, comprising:

first and second side guides adjacent to the opening in the structure and spaced apart from each other, the first and second side guides being configured to receive the first and second side portions respectively of the barrier; and a barrier retention system connected to the first and second side portions of the barrier and configured to be at least partially contained in the housing while the barrier is in the retracted position and to be slidably positioned in the first and second side guides when the barrier is in the deployed position, the barrier retention system comprises:

a plurality of tabs spaced apart along first and second side edge portions of the barrier and configured to extend into a portion of the first or second side guides, the tabs each have proximal and distal ends, the proximal end being connected to the first or second side edge portion of the barrier, and the distal end being spaced apart from the respective first or second side edge portion of the barrier, each tab comprises;

an internal reinforcement segment with a first aperture adjacent to the distal end;

fire-resistant fabric strips covering the internal reinforcement segment, wherein each fabric strip has at least one second aperture axially aligned with the first aperture on the internal reinforcement segment; and a retention pin extending through the first and second apertures, wherein the retention pin is substantially normal to the distal end of the respective tab, wherein the retention rod is configured to be slidably translatable within the first or second side guide and being blocked from pulling out of the first or second side guide so as to retain the first and second side edge portions of the barrier immediately adjacent to the respective first and second side guides.

Example 32. The barrier system of Example 31 wherein the first side guide comprises a first slot and a first channel, the second side guide comprises a second slot and a second channel, and while the flexible barrier is in the deployed position, the first side portion of the fire screen is in the first slot, the second side portion of the fire screen is in the second slot, the plurality of rods on the first side portion is in the first channel, and the plurality of rods on the second side portion is in the second channel.

Example 33. The barrier system of Example 32 wherein a length of the first slot is longer than the distance between the first side portion of the flexible barrier and the plurality of rods in the first channel while the flexible barrier is in the deployed position.

Example 34. The barrier system of Example 33 wherein a length of each of the plurality of rods is greater than a width of the first slot and less than a width of the first channel.

Example 35. The barrier system of Example 31 wherein the internal reinforcement segment is made of metal.

Example 36. The barrier system of Example 31 wherein the fire-resistant fabric strips of each tab are stitched together to enclose the internal reinforcement segment.

Example 37. The barrier system of Example 31 wherein each tab of the plurality of tabs has a push-on fastener connected to the rod and coaxially aligned with the first and second apertures, wherein the push-on fastener retains the rods in position relative to the internal reinforcement segment and the fire-resistant fabric strips.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

We claim:

1. A deployable barrier system for blocking transmission of smoke or fire, comprising:

a housing;

a barrel portion contained in the housing and being rotatable in opposing first and second directions; a motor coupled to the barrel portion and activatable to rotate the barrel portion in at least the first direction;

a flexible barrier coupled to the barrel portion and moveable between retracted and deployed positions, wherein the flexible barrier is rolled onto the barrel portion and contained within the housing when the flexible barrier is in the retracted position, and the flexible barrier is unrolled from the barrel portion and with at least a portion extending downwardly from the housing when the flexible barrier is in the deployed position, wherein rotation of the barrel portion in the first direction upon activation of the motor is configured to roll the flexible barrier onto the barrel portion to move the flexible barrier from the deployed position to the retracted position, and the flexible barrier being moveable under at least the force of gravity from the retracted position to the deployed position causing the barrel portion to rotate in the second direction; and a retract assist system configured to assist a user in manually moving the flexible barrier from the deployed position toward the retracted position with at least a portion of the flexible barrier being rolled onto the barrel portion for egress past the flexible barrier, wherein the retract assist system is positioned inside of the barrel portion, the retract assist system comprising:

an inner shaft with opposing first and second end portions;

a spring member positioned about the inner shaft and having an idle end portion and a rotating end portion;

a first attachment member fixedly attached to the first end portion of the inner shaft and to the idle end portion of the spring member, wherein the first attachment member, the inner shaft, and the idle end portion of the spring member are configured to be fixed and to not rotate relative to the housing upon rotation of the barrel portion and movement of the flexible barrier between the retracted and deployed positions; and a second attachment member rotatably coupled to the second end portion of the inner shaft and fixedly attached to a second portion of the barrel portion and to the rotating end portion of the spring member, wherein the second attachment member rotates with the barrel portion relative to the housing as the barrier moves between the retracted and deployed positions;

wherein the retract assist system is configured to wind the spring member relative to the inner shaft when the barrel portion moves in the first direction and the flexible barrier moves to the deployed position to create a spring force configured to assist movement of the flexible barrier from the deployed position toward the retracted position when a user applies a lifting force to the flexible barrier to allow for manual egress past the barrier;

wherein the flexible barrier comprises a first side portion and a second side portion, the deployable fire or smoke barrier system further comprises: opposing first and second side guides spaced apart from each other; and a barrier retention system mounted to the side edge portions of the flexible barrier, the barrier retention system configured to be inside the housing while the flexible barrier is in the retracted position, and to be in the first and second side guides when the flexible barrier is in the deployed position, wherein the barrier retention system comprises a plurality of tabs spaced apart along first and second side edge portions of the flexible barrier and configured to extend into a portion of the first or second side guides, the tabs each have proximal and distal ends, the proximal end being connected to the first or second side edge portion of the flexible barrier, and the distal end being spaced apart from the respective first or second side edge portion of the flexible barrier, each tab comprises; an internal reinforcement segment with a first aperture adjacent to the distal end; fire-resistant fabric strips covering the internal reinforcement segment, wherein each fabric strip has at least one second aperture axially aligned with the first aperture on the internal reinforcement segment; and a retention pin extending through the first and second apertures, wherein the retention pin is substantially normal to the distal end of the respective tab, wherein the retention pin is configured to be slidably translatable within the first or second side guide and being blocked from pulling out of the first or second side guide so as to retain the first and second side edge portions of the flexible barrier immediately adjacent to the respective first and second side guides.

2. The deployable barrier system of claim 1, further comprising a preload axle attached to the first attachment member and adjustably rotatable to cause a preloaded torsional force in the spring member before the first attachment member and the idle end portion of the spring member are fixed in position relative to the housing.

3. The deployable barrier system of claim 1, further comprising a bearing member coaxially coupled to the first attachment member and fixedly attached to a first portion of the barrel portion, the bearing member configured to allow the barrel portion to rotate in the first and second directions relative to the first attachment member and to the idle end portion of the spring member.

4. The deployable barrier system of claim 1 wherein the barrel portion, the inner shaft, and the spring member are concentric.

5. The deployable barrier system of claim 1 wherein the flexible barrier comprises a lifting strap at a bottom portion, wherein the user applies the lifting force to the lifting strap, wherein the lifting force is assisted by the spring force to move the flexible barrier away from the deployed position to allow for manual egress past the flexible barrier.

6. The deployable barrier system of claim 1 wherein the spring member is a torsion spring.

7. The deployable barrier system of claim 6 wherein the first attachment member is a first spring winding cone, and the second attachment member is a second spring winding cone.

8. The deployable barrier system of claim 3 wherein the bearing member is a first bearing member and wherein the deployable barrier system further comprises a second bearing member fixedly attached to the second end portion of the inner shaft, coaxially coupled to the second attachment member, and configured to allow the barrel portion to rotate in the first and second directions relative to the inner shaft.

9. The deployable barrier system of claim 8 wherein the first and second bearing members are ball bearings.

10. The deployable barrier system of claim 2 further comprising a preload retention member configured to fixedly attach a bearing member to the preload axle after the preload axle causes the preloaded torsional force in the spring member, and configured to be removed after the first attachment member and the idle end portion of the spring member are fixed in position relative to the housing.

11. The deployable barrier system of claim 10 wherein the preload retention member is a pin removably inserted into a portion of the preload axle.

12. The deployable barrier system of claim 1 further comprising a one-way bearing member positioned inside the barrel portion and coaxially coupled to the motor.

13. The deployable barrier system of claim 1 wherein the inner shaft has a low-friction material thereon adjacent to the spring member.

14. The deployable barrier system of claim 13 wherein the low-friction material is a lubricious material.

* * * * *